United States Patent
Eryurek et al.

(10) Patent No.: US 6,701,274 B1
(45) Date of Patent: Mar. 2, 2004

(54) PREDICTION OF ERROR MAGNITUDE IN A PRESSURE TRANSMITTER

(75) Inventors: Evren Eryurek, Minneapolis, MN (US); Gary A. Lenz, Eden Prairie, MN (US); Kadir Kavaklioglu, Edina, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/384,876

(22) Filed: Aug. 27, 1999

(51) Int. Cl.[7] .......................... G01L 11/00; G01L 13/00
(52) U.S. Cl. ...................... 702/140; 702/98; 702/130; 702/183
(58) Field of Search ............................. 702/140, 133, 702/182, 183, 130, 99, 138, 98; 700/79, 54, 28, 32, 33

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/194 |
| 3,468,164 A | 9/1969 | Sutherland | 73/343 |
| 3,590,370 A | 6/1971 | Fleischer | 324/51 |
| 3,618,592 A | 11/1971 | Stewart et al. | 128/2.05 |
| 3,688,190 A | 8/1972 | Blum | 324/61 R |
| 3,691,842 A | 9/1972 | Akeley | 73/398 C |
| 3,701,280 A | 10/1972 | Stroman | 73/194 |
| 3,849,637 A | 11/1974 | Caruso et al. | 235/151 |
| 3,855,858 A | 12/1974 | Cushing | 73/194 |
| 3,952,759 A | 4/1976 | Ottenstein | 137/12 |
| 3,973,184 A | 8/1976 | Raber | 324/51 |
| RE29,383 E | 9/1977 | Gallatin et al. | 137/14 |
| 4,058,975 A | 11/1977 | Gilbert et al. | 60/39.28 |
| 4,099,413 A | 7/1978 | Ohte et al. | 73/359 |
| 4,102,199 A | 7/1978 | Talpouras | 73/362 |
| 4,122,719 A | 10/1978 | Carlson et al. | 73/342 |

(List continued on next page.)

FOREIGN PATENT DOCUMENTS

| | | |
|---|---|---|
| DE | 32 13 866 A1 | 10/1983 |
| DE | 35 40 204 C1 | 9/1986 |
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 299 17 651 U1 | 12/2000 |
| EP | 0 122 622 A1 | 10/1984 |
| EP | 0 413 814 A1 | 2/1991 |
| EP | 0 487 419 A2 | 5/1992 |

(List continued on next page.)

OTHER PUBLICATIONS

"Software–Based Fault–Tolerant Control Design for Improved Power Plant Operation," *IEEE/IFAC Joint Symposium on Computer–Aided Control System Design*, Mar. 7–9, 1994 pp. 585–590.

(List continued on next page.)

*Primary Examiner*—John Barlow
*Assistant Examiner*—Hien Vo
(74) *Attorney, Agent, or Firm*—Westman, Champlin & Kelly, P.A.

(57) ABSTRACT

A pressure transmitter with an output predicting the magnitude of error in the pressure transmitter's output. A pressure sensor is adapted to sense a process pressure. A controller coupled to the pressure sensor generates a transmitter output representing the process pressure. A memory stores predetermined data predicting magnitudes of transmitter output error as a function of cumulative excessive sensor output levels, and also stores a record of cumulative excessive sensor output levels. The controller calculates a predicted present magnitude of transmitter output error as a function of the accumulated record and the predetermined data, and generates the prediction output.

38 Claims, 10 Drawing Sheets

U.S. PATENT DOCUMENTS

| | | | |
|---|---|---|---|
| 4,249,164 A | 2/1981 | Tivy | 340/870.3 |
| 4,250,490 A | 2/1981 | Dahlke | 340/870.37 |
| 4,279,013 A | 7/1981 | Cameron et al. | 364/105 |
| 4,337,516 A | 6/1982 | Murphy et al. | 364/551 |
| 4,399,824 A | 8/1983 | Davidson | 128/736 |
| 4,417,312 A | 11/1983 | Cronin et al. | 364/510 |
| 4,517,468 A | 5/1985 | Kemper et al. | 290/52 |
| 4,530,234 A | 7/1985 | Cullick et al. | 73/53 |
| 4,571,689 A | 2/1986 | Hildebrand et al. | 364/481 |
| 4,635,214 A | 1/1987 | Kasai et al. | 364/551 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,707,796 A | 11/1987 | Calabro et al. | 364/552 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,777,585 A | 10/1988 | Kokawa et al. | 364/164 |
| 4,818,994 A | 4/1989 | Orth et al. | 340/870.21 |
| 4,831,564 A | 5/1989 | Suga | 364/551.01 |
| 4,841,286 A | 6/1989 | Kummer | 340/653 |
| 4,853,693 A | 8/1989 | Eaton-Williams | 340/588 |
| 4,873,655 A | 10/1989 | Kondraske | 364/553 |
| 4,907,167 A | 3/1990 | Skeirik | 364/500 |
| 4,924,418 A | 5/1990 | Bachman et al. | 364/550 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,043,862 A | 8/1991 | Takahashi et al. | 364/162 |
| 5,053,815 A | 10/1991 | Wendell | 355/208 |
| 5,067,099 A | 11/1991 | McCown et al. | 364/550 |
| 5,081,598 A | 1/1992 | Bellows et al. | 364/550 |
| 5,089,979 A | 2/1992 | McEachern et al. | 364/571.04 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCullock et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,347,843 A | 9/1994 | Orr et al. | 73/3 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,365,787 A | 11/1994 | Hernandez et al. | 73/660 |
| 5,367,612 A | 11/1994 | Bozich et al. | 395/22 |
| 5,384,699 A | 1/1995 | Levy et al. | 364/413.13 |
| 5,386,373 A | 1/1995 | Keller et al. | 364/577 |
| 5,388,465 A | 2/1995 | Okaniwa et al. | 73/861.17 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,434,774 A | 7/1995 | Seberger | 364/172 |
| 5,436,705 A | 7/1995 | Raj | 355/246 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Koluvek | 324/713 |
| 5,469,156 A | 11/1995 | Kogura | 340/870.38 |
| 5,469,735 A | 11/1995 | Watanabe | 73/118.1 |
| 5,469,749 A | 11/1995 | Shimada et al. | 73/861.47 |
| 5,481,199 A | 1/1996 | Anderson et al. | 324/705 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,495,769 A | 3/1996 | Borden et al. | 73/718 |
| 5,510,779 A | 4/1996 | Maltby et al. | 340/870.3 |
| 5,511,004 A | 4/1996 | Dubost et al. | 364/551.01 |
| 5,526,293 A | 6/1996 | Mozumder et al. | 364/578 |
| 5,539,638 A | 7/1996 | Keeler et al. | 364/424.03 |
| 5,548,528 A | 8/1996 | Keeler et al. | 364/497 |
| 5,560,246 A | 10/1996 | Bottinger et al. | 73/861.15 |
| 5,561,599 A | 10/1996 | Lu | 364/164 |
| 5,570,300 A | 10/1996 | Henry et al. | 364/551.01 |
| 5,572,420 A | 11/1996 | Lu | 364/153 |
| 5,573,032 A | 11/1996 | Lenz et al. | 137/486 |
| 5,591,922 A | 1/1997 | Segeral et al. | 73/861.04 |
| 5,598,521 A | 1/1997 | Kilgore et al. | 395/326 |
| 5,600,148 A | 2/1997 | Cole et al. | 250/495.1 |
| 5,608,650 A | 3/1997 | McClendon et al. | 364/510 |
| 5,623,605 A | 4/1997 | Keshav et al. | 395/200.17 |
| 5,633,809 A | 5/1997 | Wissenbach et al. | 364/510 |
| 5,637,802 A | 6/1997 | Frick et al. | 73/724 |
| 5,640,491 A | 6/1997 | Bhat et al. | 395/22 |
| 5,661,668 A | 8/1997 | Yemini et al. | 364/550 |
| 5,665,899 A | 9/1997 | Willcox | 73/1.63 |
| 5,669,713 A | 9/1997 | Schwartz et al. | 374/1 |
| 5,671,335 A | 9/1997 | Davis et al. | 395/23 |
| 5,675,504 A | 10/1997 | Serodes et al. | 364/496 |
| 5,675,724 A | 10/1997 | Beal et al. | 395/182.02 |
| 5,680,109 A | 10/1997 | Lowe et al. | 340/608 |
| 5,682,317 A | 10/1997 | Keeler et al. | 364/431.03 |
| 5,700,090 A | 12/1997 | Eryurek | 374/210 |
| 5,703,575 A | 12/1997 | Kirpatrick | 340/870.17 |
| 5,704,011 A | 12/1997 | Hansen et al. | 395/22 |
| 5,705,978 A | 1/1998 | Frick et al. | 340/511 |
| 5,708,211 A | 1/1998 | Jepson et al. | 73/861.04 |
| 5,708,585 A | 1/1998 | Kushion | 364/431.061 |
| 5,710,370 A | 1/1998 | Shanahan et al. | 73/1.35 |

| | | | |
|---|---|---|---|
| 5,713,668 A | 2/1998 | Lunghofer et al. ......... 374/179 |
| 5,719,378 A | 2/1998 | Jackson, Jr. et al. ........ 219/497 |
| 5,736,649 A | 4/1998 | Kawasaki et al. ....... 73/861.23 |
| 5,741,074 A | 4/1998 | Wang et al. ................. 374/185 |
| 5,742,845 A | 4/1998 | Wagner ...................... 395/831 |
| 5,746,511 A | 5/1998 | Eryurek et al. ................. 374/2 |
| 5,747,701 A | 5/1998 | Marsh et al. ............ 73/861.23 |
| 5,752,008 A | 5/1998 | Bowling ..................... 395/500 |
| 5,764,891 A | 6/1998 | Warrior ................... 395/200.2 |
| 5,781,878 A | 7/1998 | Mizoguchi et al. ......... 701/109 |
| 5,801,689 A | 9/1998 | Huntsman .................. 345/329 |
| 5,805,442 A | 9/1998 | Crater et al. ................ 364/138 |
| 5,817,950 A | 10/1998 | Wiklund et al. ......... 73/861.66 |
| 5,828,567 A | 10/1998 | Eryurek et al. ............. 364/184 |
| 5,829,876 A | 11/1998 | Schwartz et al. .............. 374/1 |
| 5,848,383 A | 12/1998 | Yuuns ........................ 702/102 |
| 5,859,964 A | 1/1999 | Wang et al. ........... 395/185.01 |
| 5,876,122 A | 3/1999 | Eryurek ...................... 374/183 |
| 5,880,376 A | 3/1999 | Sai et al. ................. 73/861.08 |
| 5,887,978 A | 3/1999 | Lunghofer et al. ......... 374/179 |
| 5,908,990 A | 6/1999 | Cummings ............... 73/861.22 |
| 5,923,557 A | 7/1999 | Eidson .................. 364/471.03 |
| 5,924,086 A | 7/1999 | Mathur et al. ................. 706/25 |
| 5,926,778 A | 7/1999 | Poppel ....................... 702/130 |
| 5,936,514 A | 8/1999 | Anderson et al. ...... 340/310.01 |
| 5,940,290 A | 8/1999 | Dixon ........................ 364/138 |
| 5,956,663 A | 9/1999 | Eryurek et al. ............. 702/183 |
| 5,970,430 A | 10/1999 | Burns et al. ................ 702/122 |
| 6,014,902 A | 1/2000 | Lewis et al. ............. 73/861.12 |
| 6,016,523 A | 1/2000 | Zimmerman et al. ......... 710/63 |
| 6,016,706 A | 1/2000 | Yamamoto et al. ................. 9/6 |
| 6,017,143 A | 1/2000 | Eryurek et al. ............... 700/51 |
| 6,023,399 A | 2/2000 | Kogure ........................ 361/23 |
| 6,038,579 A | 3/2000 | Sekine ....................... 708/400 |
| 6,045,260 A | 4/2000 | Schwartz et al. ........... 374/183 |
| 6,047,220 A | 4/2000 | Eryurek et al. ............... 700/28 |
| 6,047,222 A | 4/2000 | Burns et al. .................. 700/79 |
| 6,052,655 A | 4/2000 | Kobayashi et al. .......... 702/184 |
| 6,072,150 A | 6/2000 | Sheffer .................. 219/121.83 |
| 6,112,131 A | 8/2000 | Ghorashi et al. ........... 700/142 |
| 6,119,047 A | 9/2000 | Eryurek et al. ............... 700/28 |
| 6,119,529 A | 9/2000 | DiMarco et al. .......... 73/861.68 |
| 6,139,180 A | 10/2000 | Usher et al. ................... 374/1 |
| 6,192,281 B1 | 2/2001 | Brown et al. .................. 700/2 |
| 6,195,591 B1 | 2/2001 | Nixon et al. .................. 700/83 |
| 6,199,018 B1 | 3/2001 | Quist et al. .................... 702/34 |
| 6,236,948 B1 | 5/2001 | Eck et al. ...................... 702/45 |
| 6,263,487 B1 | 7/2001 | Stripf et al. .................... 717/1 |
| 6,298,377 B1 | 10/2001 | Hartikainen et al. ......... 709/223 |
| 6,311,136 B1 | 10/2001 | Henry et al. .................. 702/45 |
| 6,327,914 B1 | 12/2001 | Dutton .................. 73/861.356 |
| 6,347,252 B1 | 2/2002 | Behr et al. ...................... 700/3 |
| 6,360,277 B1 | 3/2002 | Ruckley et al. ............. 709/250 |
| 6,370,448 B1 | 4/2002 | Eryurek ...................... 700/282 |
| 6,397,114 B1 | 5/2002 | Eryurek et al. ............... 700/51 |
| 6,425,038 B1 | 7/2002 | Sprecher ..................... 710/269 |

FOREIGN PATENT DOCUMENTS

| | | | |
|---|---|---|---|
| EP | 0 512 794 A2 | 5/1992 |
| EP | 0 512 794 A2 | 11/1992 |
| EP | 0 594 227 A1 | 4/1994 |
| EP | 0 624 847 A1 | 11/1994 |
| EP | 0 644 470 A2 | 3/1995 |
| EP | 0 825 506 A2 | 7/1997 |
| EP | 0 827 096 A2 | 9/1997 |
| EP | 0 838 768 A2 | 9/1997 |
| EP | 0 807 804 A2 | 11/1997 |
| EP | 1058093 A1 | 5/1999 |
| EP | 1 022 626 A2 | 7/2000 |
| FR | 2 302 514 | 9/1976 |
| FR | 2 334 827 | 7/1977 |
| GB | 928704 | 6/1963 |
| GB | 1 534 280 | 11/1978 |
| GB | 2 310 346 A | 8/1997 |
| GB | 2 347 232 A | 1/2000 |
| GB | 2342453 | 4/2000 |
| JP | 58-129316 | 8/1983 |
| JP | 59-116811 | 7/1984 |
| JP | 59163520 | 9/1984 |
| JP | 59-211196 | 11/1984 |
| JP | 59-211896 | 11/1984 |
| JP | 60000507 | 1/1985 |
| JP | 60-76619 | 5/1985 |
| JP | 60-131495 | 7/1985 |
| JP | 60174915 | 9/1985 |
| JP | 62-30915 | 2/1987 |
| JP | 64-1914 | 1/1989 |
| JP | 64001914 | 1/1989 |
| JP | 64-72699 | 3/1989 |
| JP | 2-5105 | 1/1990 |
| JP | 03 229124 | 10/1991 |
| JP | 03229124 | 11/1991 |
| JP | 5-122768 | 5/1993 |
| JP | 06242192 | 9/1994 |
| JP | 7-63586 | 3/1995 |
| JP | 07234988 | 9/1995 |
| JP | 8-54923 | 2/1996 |
| JP | 8-136386 | 5/1996 |
| JP | 8-166309 | 6/1996 |
| JP | 08247076 | 9/1996 |
| JP | 2712625 | 10/1997 |
| JP | 2712701 | 10/1997 |
| JP | 2712625 | 2/1998 |
| JP | 2753592 | 3/1998 |
| JP | 07225530 | 5/1998 |
| JP | 10-232170 | 9/1998 |
| JP | 11083575 | 3/1999 |
| WO | WO 94/25933 | 11/1994 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/20469 | 5/1998 |
| WO | WO 98/39718 | 9/1998 |
| WO | WO 99/19782 | 10/1998 |
| WO | WO 00/55700 | 3/2000 |
| WO | WO 00/70531 | 11/2000 |

OTHER PUBLICATIONS

"Using Artificial Neural Networks to Identify Nuclear Power Plant States," by Israel E. Alguindigue et al., pp. 1–4.

"Taking Full Advantage of Smart Transmitter Technology Now," by G. Orrison. *Control Engineering*, vol. 42, No. 1, Jan. 1995.

"Automated Generation of Nonlinear System Characterization for Sensor Failure Detection," by B.R. Upadhyaya et al., *ISA*, 1989 pp. 269–274.

"Application of Neural Networks for Sensor Validation and Plant Monitoring," by B. Upadhyaya et al., *Nuclear Technology*, vol. 97, No. 2, Feb. 1992 pp. 170–176.

"Detecting Blockage in Process Connections of Differential Pressure Transmitters", by E. Taya et al., *SICE*, 1995, pp. 1605–1608.

"Selection and Application", by B. Liptak et al., *Pressure Measurement*, 1995, pp. 528–530.

Journal of Intelligent Manufacturing (1997) 8, 271–276 article entitled "On–line tool condition monitoring system with wavelet fuzzy neural network".

"Improving Dynamic Performance of Temperature Sensors With Fuzzy Control Techniques," by Wang Lei et al., pp. 872–873 (1992).

"Microsoft Press Computer Dictionary" 2nd Edition, 1994, Microsoft Press.

Journal of Intelligent Manufacturing (1997) 8, 271–276 article entitled "On–line tool condition monitoring system with wavelet fuzzy neural network".

International Search Report for International Application No. PCT/US 02/14934, filed May 8, 2002, Search Report dated Apr. 28, 2002.

International Search Report for International Application No. PCT/US 02/14560, filed May 8, 2002, Search Report dated Sep. 3, 2002.

IEEE Transactions on Magnetics, vol. 34, No. 5, Sep. 1998, "Optical Design of the Coils of an Electromagnetic Flow Meter," pp. 2563–2566.

IEEE Transactions on Magnetics, vol. 30, No. 2, Mar. 1994, "Magnetic Fluid Flow Meter for Gases," pp. 936–938.

IEEE Instrumentation and Measurement, "New approach to a main error estimation for primary transducer of electromagnetic flow meter," pp. 1093–1097.

"Additional Information From Flowmeters via Signal Analysis," by J.E. Amadi–Echendu and E.H. Higham, pp. 187–193.

"Notification of Transmittal of the International Search Report or the Declaration" for PCT/US01/40791.

"Notification of Transmittal of the International Search Report or the Declaration" for PCT/US01/40782.

"A Microcomputer–Based Instrument for Applications in Platinum Resistance Thermomety," by H. Rosemary Taylor and Hector A. Navarro, Journal of Physics E. Scientific Instrument, vol. 16, No. 11, pp.1100–1104 (1983).

"Experience in Using Estelle for the Specification and Verification of a Fieldbus Protocol: FIP," by Barretto et al., Computer Networking, pp. 295–304 (1990).

"Computer Simulation of H1 Field Bus Transmission," by Utsumi et al., Advances in Instrumentation and Control, vol. 46, Part 2, pp. 1815–1827 (1991).

"Process in Fieldbus Developments for Measuring and Control Application," by A. Schwaier, Sensor and Acuators, pp. 115–119 (1991).

"Ein Emulationssystem zur Leistungsanalyse von Feldbussystemen, Teil 1," by R. Hoyer, pp. 335–336 (1991).

"Simulatore Integrato: Controllo su bus di campo," by Barabino et al., Automazione e Strumentazione, pp. 85–91 (Oct. 1993).

"Ein Modulares, verteiltes Diagnose–Expertensystem für die Fehlerdiagnose in lokalen Netzen," by Jürgen M. Schröder, pp. 557–565 (1990).

"Fault Diagnosis of Fieldbus Systems," by Jürgen Quade, pp. 577–581 (10/92).

"Ziele und Anwendungen von Feldbussystemen," by T. Pfeifer et al., pp. 549–557 (10/87).

"PROFIBUS–Infrastrukturmaβnahmen," by Tilo Pfeifer et al., pp. 416–419 (8/91).

"Simulation des Zeitverhaltens von Feldbussystemen," by O. Schnelle, pp. 440–442 (1991).

"Modélisation et simulation d'un bus de terrain: FIP," by Song et al, pp. 5–9 (undated).

"Feldbusnetz für Automatisierungssysteme mit intelligenten Funktionseinheiten," by W. Kriesel et al., pp. 486–489 (1987).

"Bus de campo para la inteconnexión del proceso con sistemas digitales de control," Tecnolgía, pp. 141–147 (1990).

"Dezentrale Installation mit Echtzeit–Feldbus," Netzwerke, Jg. Nr.3 v. 14.3, 4 pages (1990).

"Process Measurement and Analysis," by Liptak et al., Instrument Engineers' Handbook, Third Edition, pp. 528–530, (1995).

"A TCP\IP Tutorial" by, Socolofsky et al., Spider Systems Limited, Jan. 1991 pp. 1–23.

"Approval Standards For Explosionproof Electrical Equipment General Requirements", Factory Mutual Research, Cl. No. 3615, Mar. 1989, pp. 1–34.

"Approval Standard Intrinsically Safe Apparatus and Associated Apparatus For Use In Class I, II, and III, Division 1 Hazardous (Classified) Locations", Factory Mutual Research, Cl. No. 3610, Oct. 1988, pp. 1–70.

"Automation On–line" by, Phillips et al., Plant Services, Jul. 1997, pp. 41–45.

"Climb to New Heights by Controlling your PLCs Over the Internet" by, Phillips et al., Intech, Aug. 1998, pp. 50–51.

"CompProcessor For Piezoresistive Sensors" MCA Technologies Inc. (MCA7707), pp. 1–8.

"Ethernet emerges as viable, inexpensive fieldbus", Paul G. Schreier, Personal Engineering, Dec. 1997, p. 23–29.

"Ethernet Rules Closed–loop System" by, Eidson et al., Intech, Jun. 1998, pp. 39–42.

"Fieldbus Standard for Use in Industrial Control Systems Part 2: Physical Layer Specification and Service Definition", ISA–S50.02–1992, pp. 1–93.

"Fieldbus Standard for Use in Industrial Control Systems Part 3: Data Link Service Definition", ISA–S50.02–1997, Part 3, Aug. 1997, pp. 1–159.

Fieldbus Standard For Use in Industrial Control Systems Part 4: Data Link Protocol Specification, ISA–S50.02–1997, Part 4, Aug. 1997, pp. 1–148.

"Fieldbus Support For Process Analysis" by, Blevins et al., Fisher–Rosemount Systems, Inc., 1995, pp. 121–128.

"Fieldbus Technical Overview Understanding FOUNDATION™ fieldbus technology", Fisher–Rosemount, 1998, pp. 1–23.

"Hypertext Transfer Protocol—HTTP/1.0" by Berners–Lee et al., MIT/LCS, May 1996, pp. 1–54.

"Infranets, Intranets, and the Internet" by, Pradip Madan, Echelon Corp, Sensors, Mar. 1997, pp. 46–50.

"Internet Technology Adoption into Automation" by, Fondl et al., Automation Business, pp. 1–5.

"Internet Protocol Darpa Internet Program Protocol Specification" by, Information Sciences Institute, University of Southern California, RFC 791, Sep. 1981, pp. 1–43.

"Introduction to Emit", emWare, Inc., 1997, pp. 1–22.

"Introduction to the Internet Protocols" by, Charles L. Hedrick, Computer Science Facilities Group, Rutgers University, Oct. 3, 1988, pp. 1–97.

"Is There A Future For Ethernet in Industrial Control?", Miclot et al., Plant Engineering, Oct. 1988, pp. 44–46, 48, 50.

LFM/SIMA Internet Remote Diagnostics Research Project Summary Report, Stanford University, Jan. 23, 1997, pp. 1–6.

"Managing Devices with the Web" by, Howard et al., Byte, Sep. 1997, pp. 45–64.

"Modular Microkernel Links GUI And Browser For Embedded Web Devices" by, Tom Williams, pp. 1–2.

"PC Software Gets Its Edge From Windows, Components, and the Internet", Wayne Labs, I&CS, Mar. 1997, pp. 23–32.

Proceedings Sensor Expo, Aneheim, California, Produced by Expocon Managemnet Associates, Inc., Apr. 1996, pp. 9–21.

Proceedings Sensor Expo, Boston, Massachuttes, Produced by Expocon Management Associates, Inc., May 1997, pp. 1–416.

"Smart Sensor Network of the Future" by, Jay Warrior, Sensors, Mar. 1997, pp. 40–45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1–78.

"Advanced Engine Diagnostics Using Universal Process Modeling", by P. O'Sullivan et al., *Presented at the 1996 SAE Conference on Future Transportion Technology*, pp. 1–9.

"On–Line Statistical Process Control for a Glass Tank Ingredient Scale," by R.A. Weisman, *IFAC real Time Programming*, 1985, pp. 29–38.

"The Performance of Control Charts for Monitoring Process Variation," by C. Lowry et al., *Commun. Statis.—Simula.*, 1995, pp. 409–437.

"A Knowledge–Based Approach for Detection and Diagnosis of Out–Of–Control Events in Manufacturing Processes," by P. Love et al., *IEEE*, 1989, pp. 736–741.

"Smart Temperature Measurement in the '90s", by T. Kerlin et al., *C&I*, (1990).

"In Situ Calibration of Nuclear Plant Platinum Resistance Thermometers Using Johnson Noise Methods," *EPRI*, Jun. 1983.

"Johnson Noise Thermometer for High Radiation and High–Temperature Environments," by L. Oakes et al., *Fifth Symposium on Space Nuclear Power Systems*, Jan. 1988, pp. 2–23.

"Development of a Resistance Thermometer For Use Up to 1600° C", by M.J. de Groot et al., *CAL LAB*, Jul./Aug. 1996, pp. 38–41.

"Survey, Applications, And Prospects of Johnson Noise Thermometry," by T. Blalock et al., *Electrical Engineering Department*, 1981 pp. 2–11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249–1259.

"Tuned–Circuit Dual–Mode Johnson Noise Thermometers," by R.L. Shepard et al., Apr. 1992.

"Tuned–Circuit Johnson Noise Thermometry," by Michael Roberts et al., $7^{th}$ *Symposium on Space Nuclear Power Systems*, Jan. 1990.

"Development of a Long–Life, High–Reliability Remotely Operated Johnson Noise Thermometer," by R.L. Shepard et al., *ISA*, 1991, pp. 77–84.

"Application of Johnson Noise Thermometry to Space Nuclear Reactors," by M.J. Roberts et al., *Presented at the 6th Symposium on Space Nuclear Power Systems*, Jan. 9–12, 1989.

"A Decade of Progress in High Temperature Johnson Noise Thermometry," by T.V. Blalock et al., *American Institute of Physics*, 1982 pp. 1219–1223.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310–1314.

"A New Method of Johnson Noise Thermometry", by C.J. Borkowski et al., *Rev. Sci. Instrum.*, vol. 45, No. 2, (Feb. 1974) pp. 151–162.

"In–Situ Response Time Testing of Thermocouples", *ISA*, by H.M. Hashemian et al., Paper No. 89–0056, pp. 587–593, (1989).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284–L286.

"Check of Semiconductor Thermal Resistance Elements by the Method of Noise Thermometr", by A. B. Kisilevskii et al., *Measurement Techniques*, vol. 25, No. 3, Mar. 1982, New York, USA, pp. 244–246.

"Thermocouple Continuity Checker," IBM Technical Disclosure Bulletin, vol. 20, No. 5, pp. 1954 (Oct. 1977).

"A Self–Validating Thermocouple," Janice C–Y et al., IEEE Transactions on Control Systems Technology, vol. 5, No. 2, pp. 239–253 (Mar. 1997).

*Instrument Engineers' Handbook*, Chapter IV entitled "Temperature Measurements," by T.J. Claggett, pp. 266–333 (1982).

"emWare's Releases EMIT 3.0, Allowing Manufactures to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1–14, Rosemount Inc. (1997).

Warrior, J., "The Collision Between the Web and Plant Floor Automation," $6^{Th}$. WWW Conference Workshop on Embedded Web Technology, Santa Clara, CA (Apr. 7, 1997).

Microsoft Press Computer Dictionary, $3^{rd}$ Edition, p. 124.

"Internal Statistical Quality Control for Quality Monitoring Instruments", by P. Girling et al., *ISA*, 15 pgs., 1999.

Web Pages from www.triant.com (3 pgs.).

"Statistical Process Control (Practice Guide Series Book)", *Instrument Society of America*, 1995, pp. 1–58 and 169–204.

"Time–Frequency Analysis of Transient Pressure Signals for a Mechanical Heart Valve Cavitation Study," *ASAIO Journal*, by Alex A. Yu et al., vol. 44, No. 5, pp. M475–M479, (Sep.–Oct. 1998).

"Transient Pressure Signals in Mechanical Heart Valve Caviation," by Z.J. Wu et al., pp. M555–M561 (undated).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED–vol. 28, pp. 297–298 (Nov. 6–11, 1994).

"Monitoring and Diagnosis of Cavitation in Pumps and Valves Using the Wigner Distribution," *Hydroaccoustic Facilities, Instrumentation, and Experimental Techniques*, NCA–vol. 10, pp. 31–36 (1991).

"Developing Predictive Models for Cavitation Erosion," *Codes and Standards in A Global Environment*, PVP–vol. 259, pp. 189–192 (1993).

"Self–Diagnosing Intelligent Motors: A Key Enabler for Next Generation Manufacturing System," by Fred M. Discenzo et al., pp. 3/1–3/4 (1999).

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29–Aug. 1, 1996, pp. 50–1—50–6.

"Smart Field Devices Provide New Process Data, Increase System Flexibility," by Mark Boland, *I&CS*, Nov. 1994, pp. 45–51.

"Wavelet Analysis of Vibration, Part I: Theory[1]," by D.E. Newland, *Journal of Vibration and Acoustics*, vol. 116, Oct. 1994, pp. 409–416.

"Wavelet Analysis of Vibration, Part 2: Wavelet Maps," by D.E. Newland, *Journal of Vibration and Acoustics*, vol. 116, Oct. 1994, pp. 417–425.

"Field–based Architecture is Based on Open Systems, Improves Plant Performance", by P. Cleaveland, *I&CS*, Aug. 1996, pp. 73–74.

"Fuzzy Logic and Neural Network Applications to Fault Diagnosis", by P. Frank et al., *International Journal of Approximate Reasoning*, (1997), pp. 68–88.

"A Fault–Tolerant Interface for Self–Validating Sensors", by M.P. Henry, *Colloquium*, pp. 3/1–3/2 (Nov. 1990).

"The Implications of Digital Communications on Sensor Validation", by M. Henry et al., *Report No. QUEL 1912/92*, (1992).

"Keynote Paper: Hardware Compilation–A New Technique for Rapid Prototyping of Digital Systems–Applied to Sensor Validation", by M.P. Henry, *Control Eng. Practice*, vol. 3, No. 7., pp. 907–924, (1995).

"Neural Networks for Sensor Validation and Plant Monitoring," by B. Upadhyaya, *International Fast Reactor Safety Meeting*, Aug. 12–16, 1990, pp. 2–10.

"Intelligent Behaviour for Self–Validating Sensors", by M.P. Henry, *Advances In Measurement*, pp. 1–7, (May 1990).

"Integration of Multiple Signal Validation Modules for Sensor Monitoring," by B. Upadhyaya et al, *Department of Nuclear Engineering*, Jul. 8, 1990, pp. 1–6.

"An Integrated Architecture For Signal Validation in Power Plants," by B.R. Upadhyaya et al., *Third IEEE International Symposium on Intelligent Control*, Aug. 24–26, 1988, pp. 1–6.

"Neural Networks for Sensor Validation and Plantwide Monitoring," by E. Eryurek, 1992.

"Programmable Hardware Architectures for Sensor Validation", by M.P. Henry et al., *Control Eng. Practice*, vol. 4, No. 10., pp. 1339–1354, (1996).

"Application of Neural Computing Paradigms for Signal Validation," by B.R. Upadhyaya et al., *Department of Nuclear Engineering*, pp. 1–18.

"Sensor Validation for Power Plants Using Adaptive Back-propagation Neural Network," *IEEE Transactions on Nuclear Science*, vol. 37, No. 2, by E. Eryurek et al. Apr. 1990, pp. 1040–1047.

A Standard Interface for Self–Validating Sensors, by M.P. Henry et al., *Report No. QUEL 1884/91*, (1991).

"Development and Application of Neural Network Algorithms For Process Diagnostics," by B.R. Upadhyaya et al., *Proceedings of the 29th Conference on Decision and Control*, 1990, pp. 3277–3282.

"Fuzzy Logic and Artificial Neural Networks for Nuclear Power Plant Applications," by R.C. Berkan et al., *Proceedings of the American Power Conference*.

Parallel, Fault–Tolerant Control and Diagnostics System for Feedater Regulation in PWRS, by E. Eryurek et al., *Proceedings of the American Power Conference*.

"Signal Processing, Data Handling and Communications: The Case for Measurement Validation", by M.P. Henry, *Department of Engineering Science, Oxford University*.

"Software–Based Fault–Tolerant Control Design for Improved Power Plant Operation," *IEEE/IFAC Joint Symposium on Computer–Aided Control System Design*, Mar. 7–9, 1994 pp. 585–590.

"Using Artificial Neural Networks to Identify Nuclear Power Plant States," by Israel E. Alguindigue et al., pp. 1–4.

"Taking Full Advantage of Smart Transmitter Technology Now," by G. Orrison, *Control Engineering*, vol. 42, No. 1, Jan. 1995.

"Automated Generation of Nonlinear System Characterization for Sensor Failure Detection," by B.R. Upadhyaya et al., *ISA*, 1989 pp. 269–274.

"Application of Neural Networks for Sensor Validation and Plant Monitoring," by B. Upadhyaya et al., *Nuclear Technology*, vol. 97, No. 2, Feb. 1992 pp. 170–176.

"Detecting Blockage in Process Connections of Differential Pressure Transmitters", by E. Taya et al., *SICE*, 1995, pp. 1605–1608.

"Selection and Application", by B. Liptak et al., *Pressure Measurement*, 1995, pp. 528–530.

International Search Report for International Application No. PCT/US 02/14934, filed May 8, 2002, Search Report dated Apr. 28, 2002.

International Search Report for International Application No. PCT/US 02/14560, filed May 8, 2002, Search Report dated Sep. 3, 2002.

PREDICTION OF ERROR MAGNITUDE IN A PRESSURE TRANSMITTER

FIELD OF THE INVENTION

The present invention relates to pressure transmitters that sense process pressures and display or transmit an output with a magnitude representative of the process pressure.

BACKGROUND OF THE INVENTION

Pressure transmitters are often installed in harsh environments that can affect the accuracy of the transmitter output. Transmitter outputs are also often corrected for present environmental conditions by a controller embedded in the transmitter, using a process called compensation. Arrangements have also been proposed to store the amplitude and duration of overpressure peaks, temperature, humidity and vibration so that an alarm is triggered when the pressure transmitter is damaged so extensively that it is near the end of its useful life as shown for example in Japanese Kokoku 2,712,701 (kokai Hei 3[1991]-229124).

It is found, however, that pressure sensors in pressure transmitters are subject to physical changes as a result of past overpressures long before the end of the transmitter's life. These physical changes are especially likely to occur with pressure sensors that include metal components that are strained repeatedly by the overpressure. These physical changes result in degradation of the accuracy of the transmitter output, however this degradation can go unnoticed, resulting in degraded performance of the process and increased cost. This degradation is not corrected by known compensation arrangements which only address present environmental conditions. This degradation is also not identified by end-of-life alarms because degradation can occur early in the useful life of the transmitter.

A transmitter is needed which can predict a present magnitude of transmitter output error due to past overpressures. With such predicted magnitude available, service personnel can evaluate the magnitude of the error and take timely action to recalibrate the pressure transmitter if the error is too high.

SUMMARY OF THE INVENTION

A prediction of a present magnitude of transmitter output error due to past overpressures is calculated in a controller in a pressure transmitter. The controller calculates a predicted present magnitude of transmitter output error as a function of a record, accumulated in memory, of excessive sensor output levels and predetermined data, stored in the memory, predicting magnitudes of transmitter output error as a function of cumulative excessive sensor output levels. The controller generates a prediction output that can be read by service personnel or a control system for scheduling recalibration of the pressure transmitter.

The pressure transmitter includes a pressure sensor, adapted to sense process pressure, that couples to the controller. The controller generates a pressure transmitter output representing the magnitude of the process pressure.

The prediction output alerts service personnel when the pressure transmitter output may have shifted too much due to past overpressures, and the service personnel can take steps to recalibrate the pressure transmitter output.

DETAILED DESCRIPTION OF THE PREFERRED EMBODIMENTS

Figure 1:
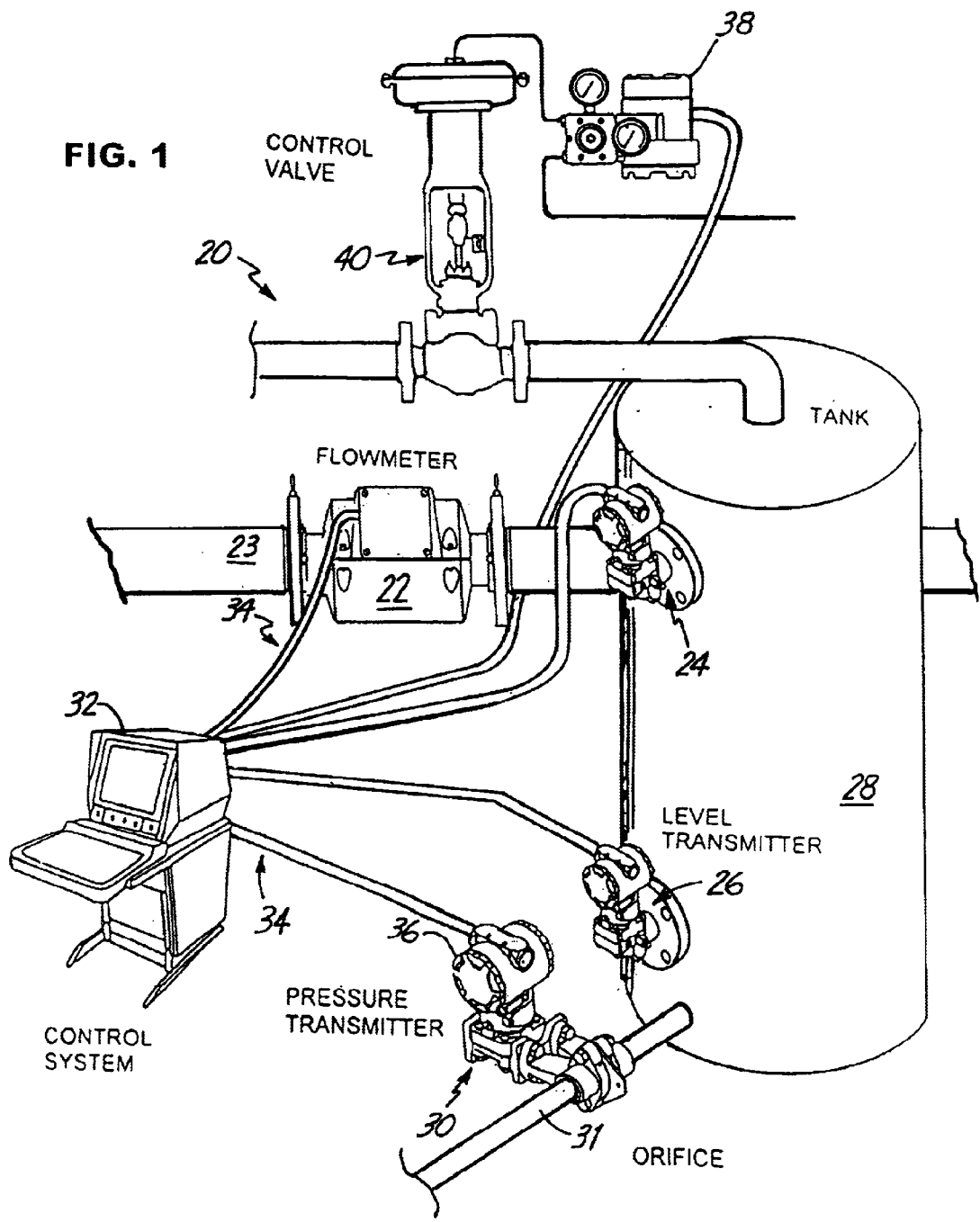
FIG. 1 shows a typical industrial environment for a loop powered industrial pressure transmitter.

In FIG. 1, a typical environment for an industrial pressure sensor is illustrated at 20. In FIG. 1, process variable transmitters such as flow meter 22 in process fluid line 23, level transmitters 24, 26 on tank 28 and integral orifice flow meter 30 in process line 31 are shown electrically connected to control system 32. Process variable transmitters can be configured to monitor one or more process variables associated with fluids in a process plant such as slurries, liquids, vapors and gasses in chemical, pulp, petroleum, gas, pharmaceutical, food and other fluid processing plants. The monitored process variables can be pressure, temperature, flow, level, pH, conductivity, turbidity, density, concentration, chemical composition or other properties of fluids. A process variable transmitter includes one or more sensors that can be either internal to the transmitter or external to the transmitter, depending on the installation needs of the process plant. Process variable transmitters generate one or more transmitter outputs that represent the sensed process variable. Transmitter outputs are configured for transmission over long distances to a controller or indicator via communication busses 34. In typical fluid processing plants, a communication buss 34 can be a 4–20 mA current loop that powers the transmitter, or a fieldbus connection, a HART (Highway Addressable Remote Transmitter) protocol communication or a fiber optic connection to a controller, a control system or a readout. In transmitters powered by a 2 wire loop, power must be kept low to provide intrinsic safety in explosive atmospheres.

In FIG. 1, integral orifice flow meter 30 includes pressure transmitter 36 that couples along a communication bus 34 connected to it. Level transmitters 24, 26 also include pressure transmitters. Control system 32 can be programmed to display process conditions for a human operator, and can be programmed to sense the process conditions and control the process via output devices such as current to pressure converter 38 and control valve 40, for example.

In FIG. 1, pressure transmitters at 24, 26 and 36 have pressure sensors that can be exposed to excessive pressures, called overpressures, in various pipes and tanks due to malfunctions or transient conditions and the like. These transients can occur during startup or shutdown of pumps and valves, are often not noticed by the operator, but can overpressure components in the process plant. Pressure sensors inside pressure transmitters at 24, 26 and 36 can have their accuracy degraded by such overpressures, but the magnitude of the degradation is typically so small that it is not noticed by the operator of control system 32, and the various measurements are no longer accurate due to the damage.

Figure 2:
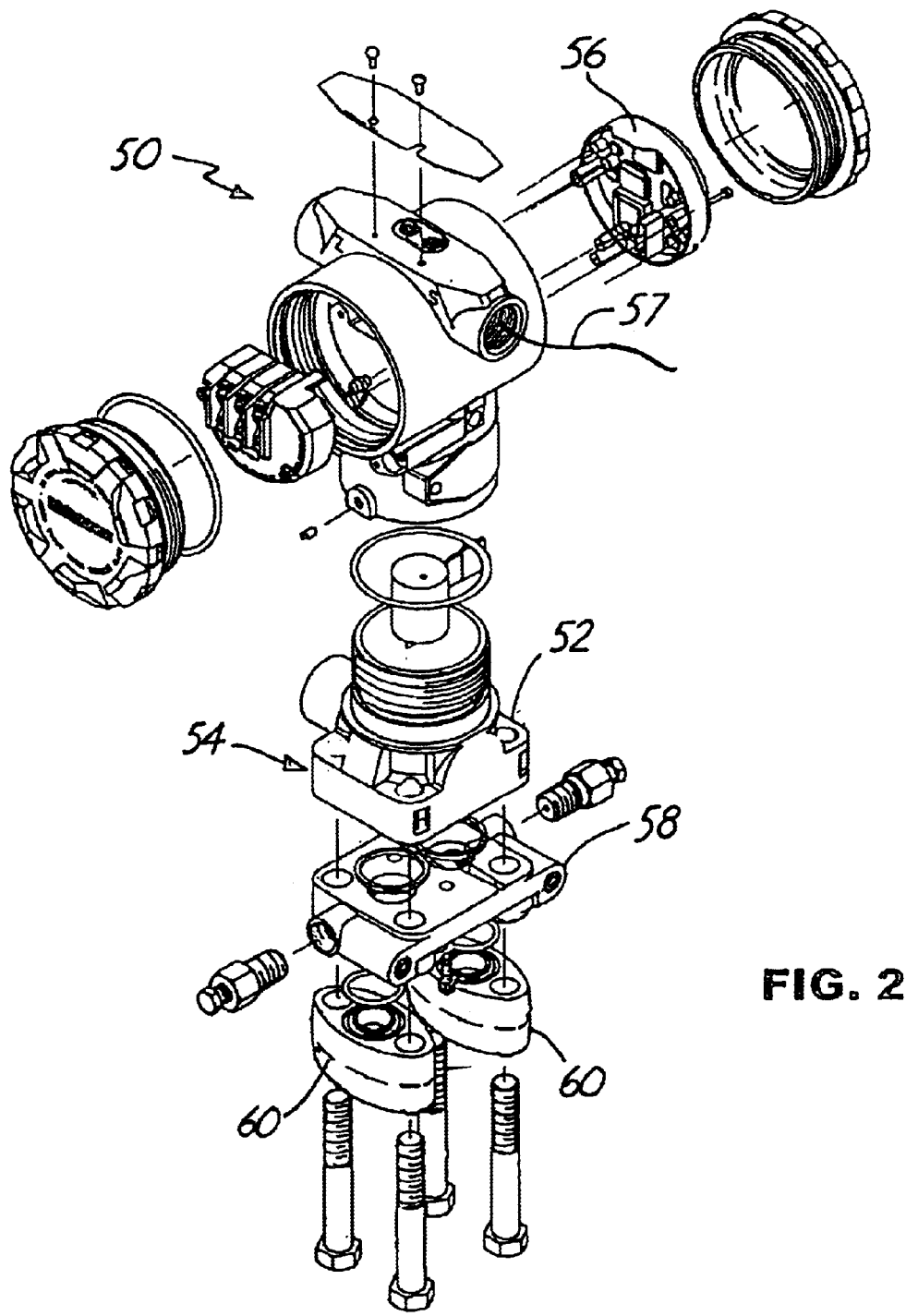
FIG. 2 shows an embodiment of a loop powered industrial differential pressure transmitter with a predictive output predicting the magnitude of error in the transmitter's pressure output due to overpressure damage.

In FIG. 2, an exploded view of a typical pressure transmitter 50 according to the present invention is shown generally. Transmitter 50 includes a flange 52 for receiving a differential pressure, and one or more pressure sensors 54 (not shown). Transmitter 50 is bolted to flange adapter 58. Flange adapter 58 connects to pressure impulse pipes connected to flange adapter unions 60 or other connection hardware.

In FIG. 2. Circuitry 56 in transmitter 50 is electrically connected to sensor 54 and includes a controller and memory for predicting the magnitude of the error in the transmitter's pressure output 57. The term "controller," as used in this application means any circuit or combination of circuits that can perform logic and counting functions to control the operation of a transmitter and perform the necessary steps to predict the magnitude of error. The controller can include, for example, a microprocessor system, an application specific integrated circuit (ASIC), a programmed gate array, a reduced instruction set computer (RISC) or other known circuits that can perform these functions. The steps performed in the controller to accomplish the controller's tasks can include neural networks, fuzzy logic, wavelets, autoregression, recursive filtering, adaptive self tuning, any other known algorithm for signal processing and control functions, as well as any combination of those steps. The controller can process the pressure sensor output using know digital signal processing techniques in the time or frequency domain including the Z transform and Fast Fourier Transform (FFT) techniques, wavelet analysis and the Discreet Wavelet Transform (DWT) as set forth in *Wavelet Analysis of Vibration, Part 2: Wavelet Maps*, D. E. Newland, JOURNAL OF VIBRATION AND ACOUSTICS, October 1994, Vol. 116, pg. 417. Other known techniques can be used as well.

Wavelet analysis is a technique for transforming a time domain signal into the frequency domain which, like a Fourier transformation, allows the frequency components to be identified. However, unlike a Fourier transformation, in a wavelet transformation the output includes information related to time. This may be expressed in the form of a three dimensional graph with time shown on one axis, frequency on a second axis and signal amplitude on a third axis. A discussion of wavelet analysis is given in *On-Line Tool Condition Monitoring System With Wavelet Fuzzy Neural Network*, by L. Xiaoli et al., 8 JOURNAL OF INTELLIGENT MANUFACTURING pgs. 271–276 (1997). In performing a continuous wavelet transformation, a portion of the sensor signal is windowed and convolved with a wavelet function. This convolution is performed by superimposing the wavelet function at the beginning of a sample, multiplying the wavelet function with the signal and then integrating the result over the sample period. The result of the integration is scaled and provides the first value for continuous wavelet transform at time equals zero. This point may be then mapped onto a three dimensional plane. The wavelet function is then shifted right (forward in time) and the multiplication and integration steps are repeated to obtain another set of data points which are mapped onto the 3-D space. This process is repeated and the wavelet is moved (convolved) through the entire signal. The wavelet function is then scaled, which changes the frequency resolution of the transformation, and the above steps are repeated.

The continuous wavelet transformation described above requires extensive computations. Therefore, in one embodiment, the controller performs a discrete wavelet transform (DWT) which is well suited for implementation in microprocessor system. One efficient discrete wavelet transform uses the Mallat algorithm which is a two channel sub-band coder. The Mallet algorithm provides a series of separated or decomposed signals which are representative of individual frequency components of the original signal. In an example of such a system in which an original sensor signal S is decomposed using a sub-band coder of a Mallet algorithm. The signal S has a frequency range from 0 to a maximum of $f_{MAX}$. The signal is passed simultaneously through a first high pass filter having a frequency range from ½ $f_{MAX}$ to $f_{MAX}$, and a low pass filter having a frequency range from 0 to ½ $f_{MAX}$. This process is called decomposition. The output from the high pass filter provides "level 1" discrete wavelet, transform coefficients. The level 1 coefficients represent the amplitude as a function of time of that portion of the input signal which is between ½ $f_{max}$ and $f_{MAX}$. The output from the 0–½ $f_{max}$ low pass filter is passed through subsequent high pass (¼ $f_{max}$–½ $f_{max}$) and low pass (0–¼ $f_{max}$) filters, as desired, to provide additional levels (beyond "level 1") of discrete wavelet transform coefficients. The outputs from each low pass filter can be subjected to further decompositions offering additional levels of discrete wavelet transformation coefficients as desired. This process continues until the desired resolution is achieved or the number of remaining data samples after a decomposition yields no additional information. The resolution of the wavelet transform is chosen to be approximately the same as the signal spikes. Each level of DWT coefficients is representative of signal amplitude as a function of time for a given frequency range. In various embodiments, the one level of DWT coefficient correlate to over pressures in the sensor signal.

In some embodiments, padding is added to the signal by adding data to the sensor signal near the borders of windows used in the wavelet analysis. This padding reduces distortions in the frequency domain output. This technique can be used with a continuous wavelet transform or a discrete wavelet transform. "Padding" is defined as appending extra data on either side of the current active data window, for example, extra data points are added which extend 25% of the current window beyond either window edge. In one embodiment, the padding is generated by repeating a portion of the data in the current window so that the added data "pads" the existing signal on either side. The entire data set is then fit to a quadratic equation which is used to extrapolate the signal 25% beyond the active data window.

A Fast Fourier Transform (FFT) or other signal processing or filtering techniques can be used to identify spikes or over pressures in the sensor signal including a rule which is a simple threshold comparison or comparison of the signal to a statistical parameter such as mean or standard deviations. The system can also be modeled using a neural network (discussed below) and compared to the actual sensor output. The residual signal can be used to detect over pressures in the sensor signal.

A spike can also be detected using a rule, a statistical value, a trained value and a sensitivity parameter. A spike event occurs when the signal momentarily goes to an extreme value. Sensitivity to spikes in the sensor signal is controlled by adjusting a sensitivity parameter from $\delta$ stored in memory 80. $\delta$ is the acceptable trained maximum rate of change ($\Delta P_{MAX}$) between two consecutive data points. For example, to detect any spikes that has a rate of change (ROC) from block 84 that is 30% greater than $\Delta r_{MAX}$ from block 78 relative to the trained value, $\delta$ from 80 should be set 1.30. An example rules is:

if $ROC > \delta \cdot \Delta r_{MAX}$ then a spike event is detected

The term "memory," as used in this application, means any circuit or combination of circuits that can store information for retrieval including RAM, ROM, EEPROM, volatile and non-volatile memory, shift registers, latches, or any other device capable of storing information and compatible with the retrieval or storage functions of the controller selected for use with the memory.

Figure 3:
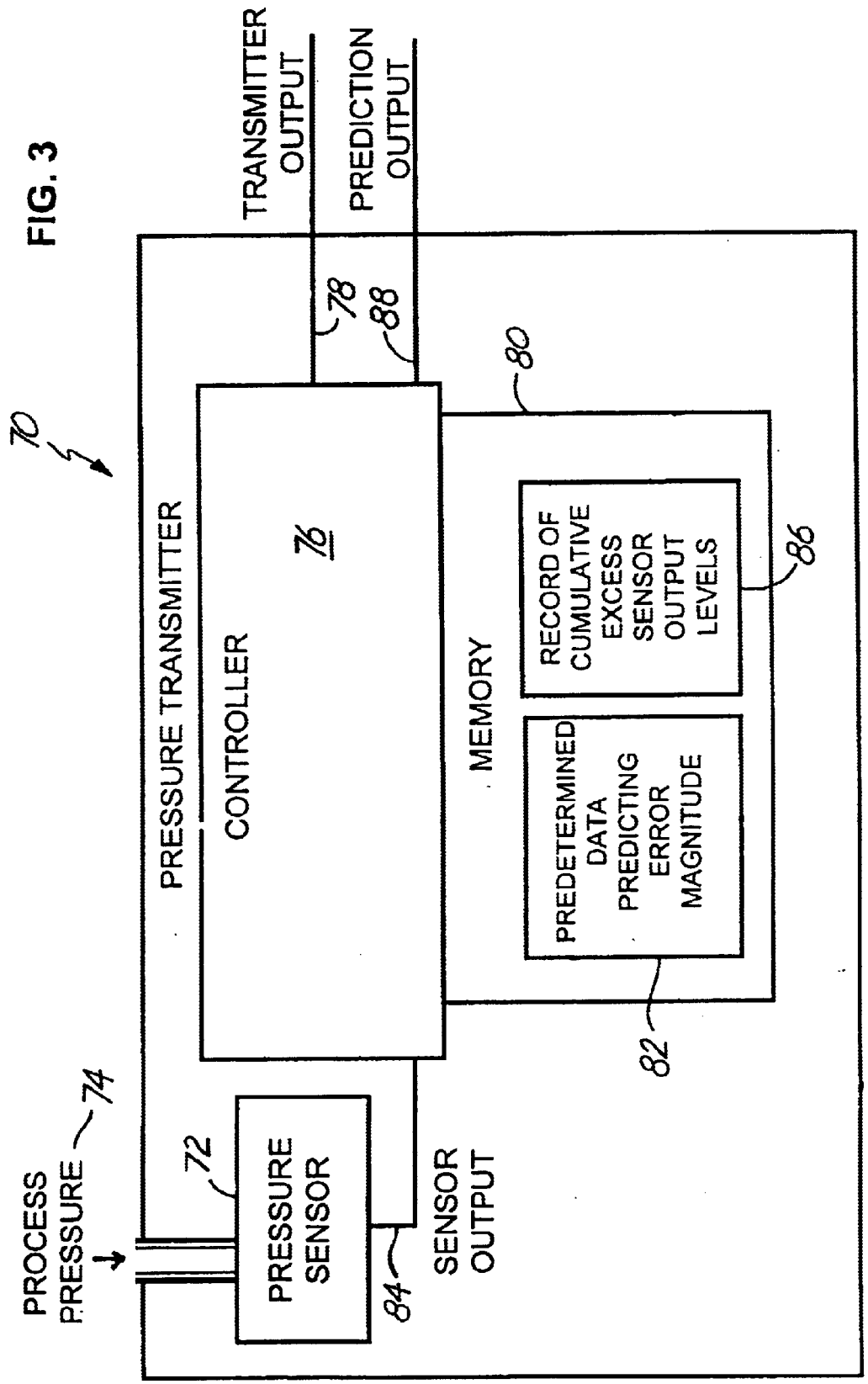
FIG. 3 shows a block diagram of a first embodiment of a pressure transmitter with an output predicting the magnitude of error in the pressure transmitter's pressure output.

In FIG. 3, a block diagram of an embodiment of a pressure transmitter 70 is shown. A pressure sensor 72 is adapted to sense a process pressure 74. A controller 76 is coupled to the pressure sensor 72 and generates a transmitter output 78 representing the magnitude of process pressure. Transmitter output 78 can have any know form of process control output, for example an intrinsically safe 4–20 mA analog current which provides all of the electrical energization for the transmitter with digital HART or Fieldbus signals superimposed on the analog current. A memory 80, coupled to the controller 76, stores predetermined data 82 predicting magnitudes of transmitter output error as a function of cumulative excessive sensor output levels at 84. The memory 80 also stores a record 86 of cumulative excessive sensor output levels. Typically, the record 86 is accumulated in read/write memory that is nonvolatile such as EEPROM, while the predetermined data is stored in read only memory (ROM). The controller 76 calculates a predicted present magnitude of transmitter output error as a function of the accumulated record 86 and the predetermined data 82, and generates a prediction output 88. The record 86 is typically representative of physical changes to the sensor resulting from overpressure. The record can include data on the amplitude and duration of overpressures indicated on the sensor output. The levels of what amplitude and duration of an "overpressure" will cause a shift in calibration is a function of the design of the sensor 72 and can be determined either experimentally by testing comparable sensors in a laboratory or can be determined by computer modeling techniques such as finite element analysis and stress analysis. The predetermined data 82 predicting error magnitude can also be determined experimentally or by computer modeling and typically takes the form of either an equation or function "F(overpressure)" or a lookup table relating predicted error to levels of overpressure. The prediction output 88 typically represents a predicted calibration shift, such as upper and lower limits of error.

The prediction output 88 can be independent of the present process pressure, or the prediction output can be a function of present process pressure. The prediction output 88 can also includes both a sensor offset error (independent of present process pressure) and a sensor gain error (proportional to present process pressure).

The predetermined data predicting error magnitude and the record of cumulative excess sensor output are data tend can be compared using known digital techniques for processing large amounts of data or statistics, such as neural networks, fuzzy logic, wavelet analysis, autoregression analysis, recursive filtering, adaptive self tuning, any other known algorithm for signal processing and control functions, as well as combinations of those steps.

Figure 4:
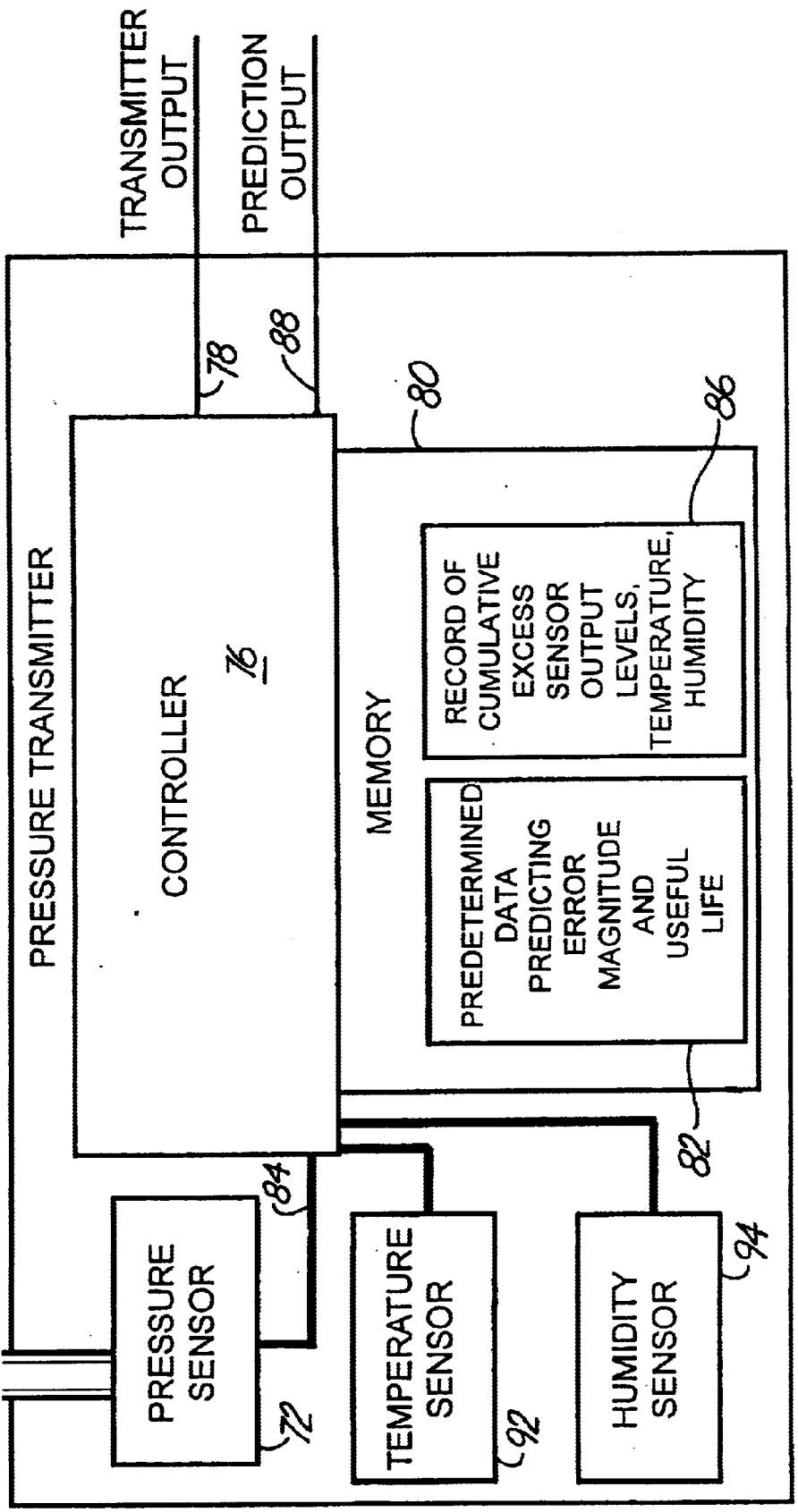
FIG. 4 shows a block diagram of a second embodiment of a pressure transmitter with an output predicting the magnitude of error in the pressure transmitter's pressure output.

In FIG. 4, a block diagram of another embodiment of a pressure transmitter 90 is shown in which the reference numerals used in FIG. 3 are also used to identify identical or similar elements in FIG. 4. In FIG. 4, the transmitter 90 further comprises a temperature sensor 92 coupled to the controller, and the predetermined data 82 predicts magnitudes of transmitter output error as a function of cumulative excessive temperature levels as well as being a function of excessive pressure levels. In FIG. 4, the pressure transmitter 90 further comprises a humidity sensor 94 coupled to the controller, and the predicted magnitude of transmitter output error can be further a function of humidity.

In FIG. 4, the record 86 is a function of the magnitudes and durations of excessive sensor output levels as well as of temperature and humidity levels. The memory 80 can further store predetermined data 82 predicting the residual useful life of the pressure sensor.

Figure 5:
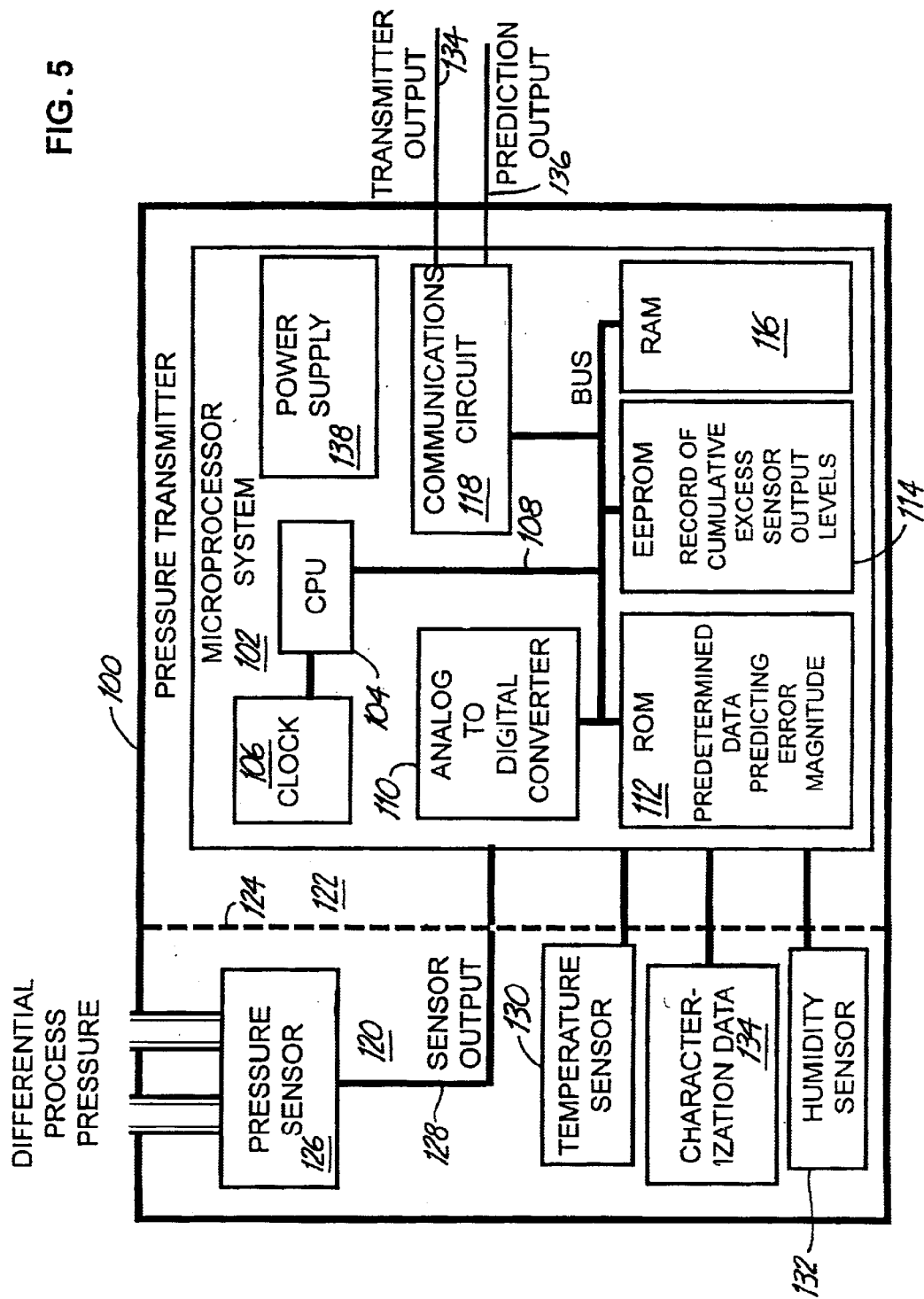
FIG. 5 shows a block diagram of a third embodiment of a pressure transmitter with an output predicting the magnitude of error in the pressure transmitter's pressure output.

In FIG. 5, a block diagram of an embodiment of a pressure transmitter 100 is shown. In transmitter 100, a microprocessor system 102 includes a central processing unit (CPU) 104 coupled to a clock source 106. CPU 104 has an address and control bus 108 coupling it to analog-to-digital converter 110, read-only-memory (ROM) 112, EEPROM 114, random access memory 116, and communications circuit 118. The transmitter 100 is divided into 2 modules 120, 122 along line 124. The division into modules allows for interchangeability. Module 120 includes differential pressure sensor 126 that provides a pressure sensor output 128, temperature sensor 130, humidity sensor 132, and a small memory 134 storing data characterizing the pressure sensor 126, the temperature sensor 130 and the humidity sensor 132. The memory 134 couples to the bus 108. The pressure sensor output 128, the temperature sensor 130 and the humidity sensor 132 couple to analog to digital converter 110 which is a multiplexing converter. ROM 112 stores predetermined data predicting error magnitude as a function of cumulative output levels from the sensors 126, 130 and 132. The EEPROM 114 stores a record of cumulative excess sensor output levels from the sensors 126, 130 and 132. The microprocessor system provides both controller and memory for the transmitter. Programs are stored in ROM 112 for comparing the predetermined data predicting error magnitude, and the record of cumulative excess sensor output levels. These programs can include neural networks, fuzzy logic, wavelet analysis, autoregression analysis, recursive filtering, adaptive self tuning, any other known algorithm for signal processing and control functions, as well as any combination of those techniques. Communications circuit 118 provides the transmitter output 134 and a prediction output 136 as explained above in connection with FIGS. 3 and 4. A power supply circuit receives power from a circuit connected to the transmitter output 134 and provides energizations for the transmitter 100. Typically the transmitter is connected to a two wire loop that energizes the transmitter. The two wire loop can also be used to carry both the transmitter output 134 and the prediction output 136 as HART or Fieldbus signals superimposed on the energization current in the two wire loop.

Figure 6:
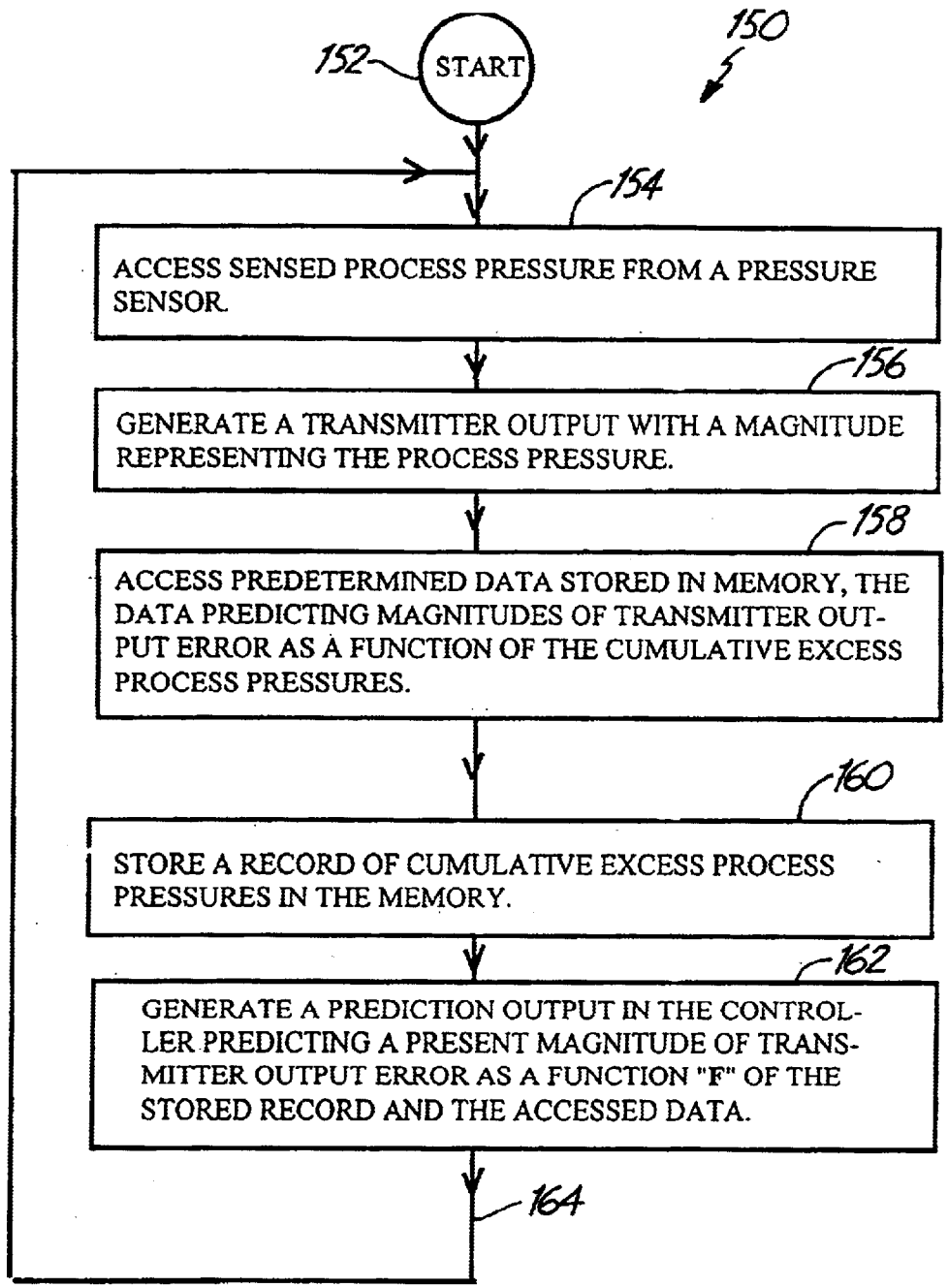
FIG. 6 shows a flow chart of a process of generating an output predicting the magnitude of error in a pressure transmitter's output.

In FIG. 6, a method of predicting transmitter error is shown at 150. The prediction process starts at START 152 and continues on to predict the present magnitude of transmitter output error in a pressure transmitter receiving an applied process pressure and having an embedded controller. At 154, the controller accesses sensed process pressure from a pressure sensor. At 156, the controller generates a transmitter output with a magnitude representing the process pressure. At 158, the controller accesses predetermined data stored in a memory, the data predicting magnitudes of transmitter output error as a function of cumulative excess process pressures. At 160, the controller stores a record of cumulative excess process pressures in the memory. At 162, the controller generates a prediction output in the controller predicting a present magnitude of transmitter output error as a function of the stored record and the accessed data. At 164, the process returns to the beginning to repeat the process.

The process shown in FIG. 6 can be stored as instructions on a computer readable medium and be executed by an embedded controller in a pressure transmitter to cause the pressure transmitter to generate a predictive output predicting transmitter error caused by excessive process pressure, the instructions.

Figure 7:
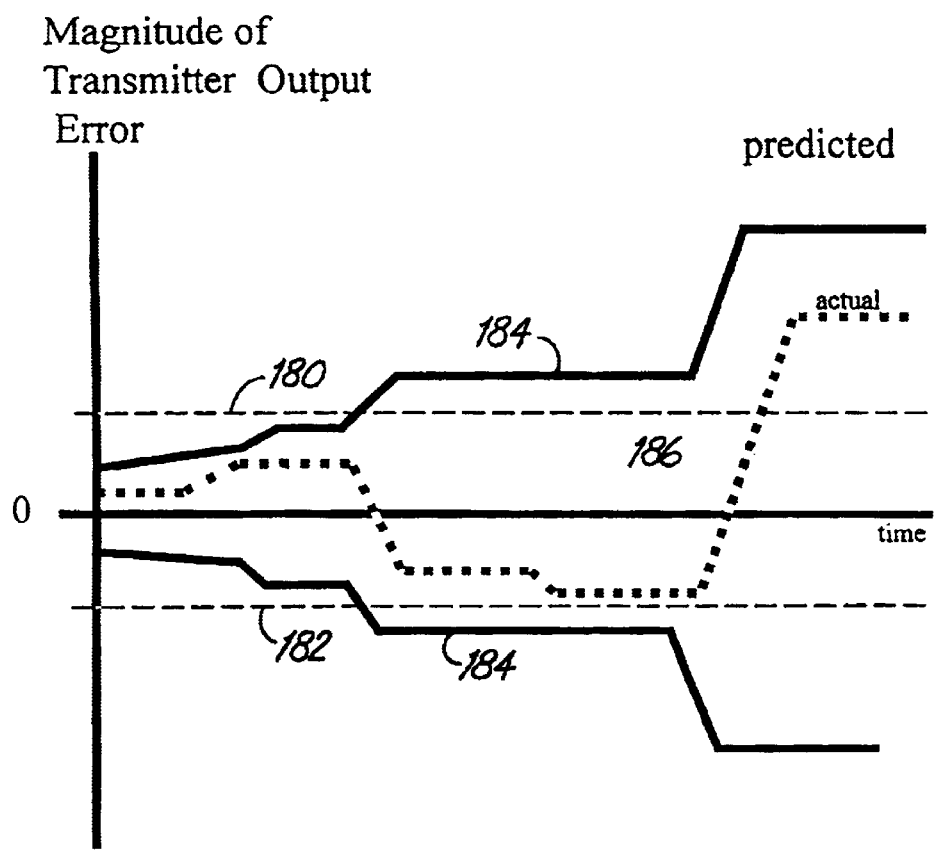
FIG. 7 shows the magnitudes of present error, an error prediction output and specified error limits for a transmitter with an output predicting the magnitude of error in the pressure transmitter's output, all as a function of time.

In FIG. 7, a graph shows exemplary values for various magnitudes of transmitter error as a function of time. The transmitter has a nominal specified range of error in the transmitter output shown between lines 180 and 182. The transmitter's actual present output error varies over time due to overpressures as shown at 186. The actual error shown at 186 is unknown to service personnel during the service life of the transmitter, unless the transmitter is taken out of service and the calibration is checked. The prediction output, shown at 184, is available to service personnel and predicts the positive and negative limits of error based on the calculations done in the controller. As a result, the service personnel are warned when a recalibration of the transmitter may be needed. After recalibration is performed by service personnel, the record of cumulative excess sensor output levels can be reset to zero and the transmitter can be put back in service.

The controller performs diagnostics related to operation of pressure sensor 72 using the detected spikes. The timing, amplitude, width, wave shape or other parameters of the spikes can be used for diagnostics. The output from the diagnostics can be used to correct the sensed pressure and to provide an indication of the condition or expected lifetime of the sensor. This allows the sensor to be replaced prior to its ultimate failure. However, in the interim, prior to sensor replacement the output from the sensor can be compensated such that more accurate measurements can be obtained.

The following describes a number of embodiments for realizing the diagnostic circuitry in controller 76. A residual life estimate may be representative of an impending sensor failure. In one embodiment, a state of health output is indicative of the remaining life of the sensor such that sensor replacement may be timed appropriately. An alarm signal can also be sent to control system 32 prior to sensor failure.

A. Polynomial Curvefit

One preferred embodiment controller 76 in the present invention uses empirical models or polynomial curve-fitting. A polynomial-like equation which has a combination of the six secondary signals as the variable terms in the polynomial, together with constants stored in memory 80 is used for computing the residual lifetime estimate. If transmitter memory is limited, the constants and/or the equation may be sent over the two wire loop to transmitter 70.

B. Nearal Networks

Figure 8:
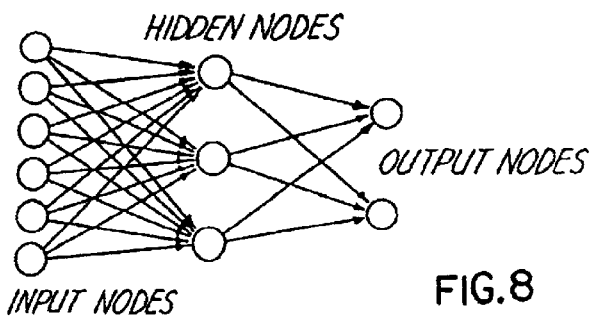
FIG. 8 is a diagram showing a simplified neural network.

One diagnostic circuit is implemented with a multi-layer neural network. Although a number of training algorithms can be used to develop a neural network model for different goals. One embodiment includes the known Backpropagation Network (BPN) to develop neural network modules which will capture the nonlinear relationship among a set of input and output(s). FIG. 8 shows a typical topology of a three-layer neural network architecture implemented in controller 76 and memory 80. The first layer usually referred to as the input buffer, receives the information, and feeds them into the inner layers. The second layer, in a three-layer network, commonly known as a hidden layer, receives the information from the input layer, modified by the weights on the connections and propagates this information forward. This is illustrated in the hidden layer which is used to characterize the nonlinear properties of the system analyzed. The last layer is the output layer where the calculated outputs (estimations) are presented to the environment.

Figure 9A:
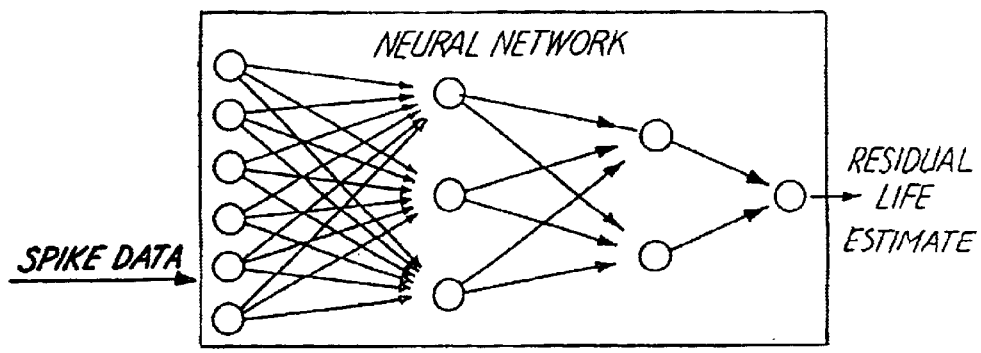
FIG. 9A is a diagram showing a neural network used to provide a residual lifetime estimate.
Figure 9B:
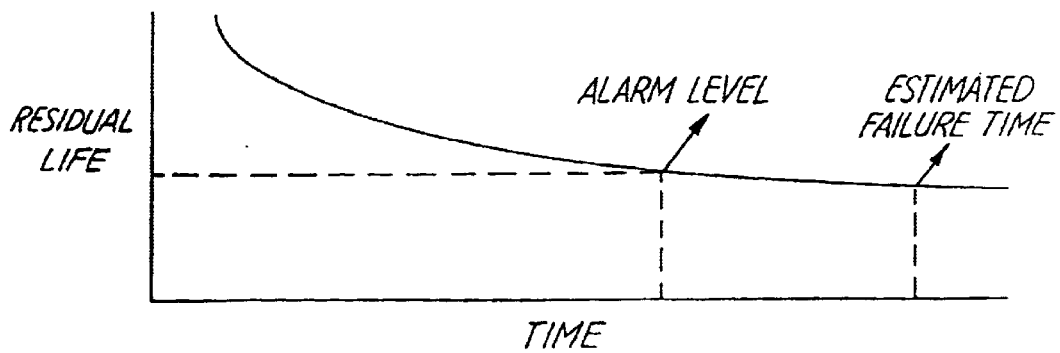
FIG. 9B is a graph of sensor residual life versus time.

FIG. 9A shows a schematic for residual life estimation of pressure sensors using a neural network model. Spike related data is provided as an input to the neural network. A residual life estimate or a compensation value is provided as an output from the neural network. The particular spike data input to the neural network can be number of spikes, their size, the amplitude, width, shapes, frequency, statistical values related to spikes such as mean, average, rate of change, etc., or comparisons or functions of multiple spikes. A number of inputs to the neural network may differ depending upon the complexity of the system, and any one or combination of multiple inputs can be used. Temperature or humidity can also be used as inputs. FIG. 9B is a graph showing pressure sensor residual life versus time. This can be generated from the sensor output using the output from the neural network of FIG. 9A. At a first threshold level, an alarm signal can be provided prior, to the ultimate failure of the sensor. The alarms signal can be calibrated relative to the estimated ultimate failure time.

C. Threshold Circuitry

This embodiment of diagnostic circuitry implemented in controller 76 uses a set of if-then rules to reach a conclusion on the status of pressure sensor 72. These rules may be implemented in either digital or analog circuitry. The previously described spike data is monitored and present values are compared to upper and lower boundaries. The upper and lower boundaries are empirically set by extensive testing of pressure sensor 72. A decision is made based upon the comparison.

In a digital embodiment of this type of diagnostic circuitry, the spike data is monitored and compared with acceptable ranges by a microprocessor.

The following is a sample if-then rule for spikes in sensor output 84 from pressure sensor 72:

If the number of spikes detected since commissioning multiplied by a value in memory 80 is greater than an upper threshold, then the residual life estimate of pressure sensor 72 is n days.

Of course, this is one simple illustration of a rule and more complex rules can be implemented in accordance with the invention. Rules can be implemented interdependently and can function as inputs or receive outputs from a neural network and can use other data related to the sensor output, temperature or humidity information.

D. Fuzzy Logic

The spike data can also be processed using fuzzy logic techniques. Using fuzzy logic, input data is processed as a function of a membership function which is selected based upon a value of the input data. Such fuzzy logic techniques are well suited for sensors which fail in a nonlinear or nonbinary fashion. The spike data such as the total number of spikes can be provided as an input for the fuzzy logic which can provide a continuous output indicating expected lifetime or a correction value which is used to correct the output from pressure sensor 72. In another aspect of the invention, the transmitter estimates or predicts the measured process variable during the occurrence of a spike/over pressure. The estimate can generate through curve fitting, linear approximation, a neural network, fuzzy logic, least squares curve fit, polynomial approximation, regression algorithm, etc., or their combination. The estimated process variable is provided as an output or used to calculate other process variables such as flow or level.

Figure 10:
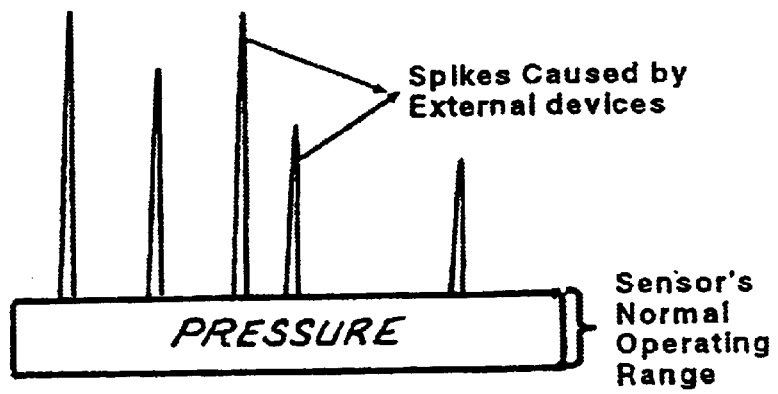
FIG. 10 is a graph showing the output of a pressure sensor including a normal pressure range and a number of spikes due to overpressures experienced by the sensor.
Figure 11:
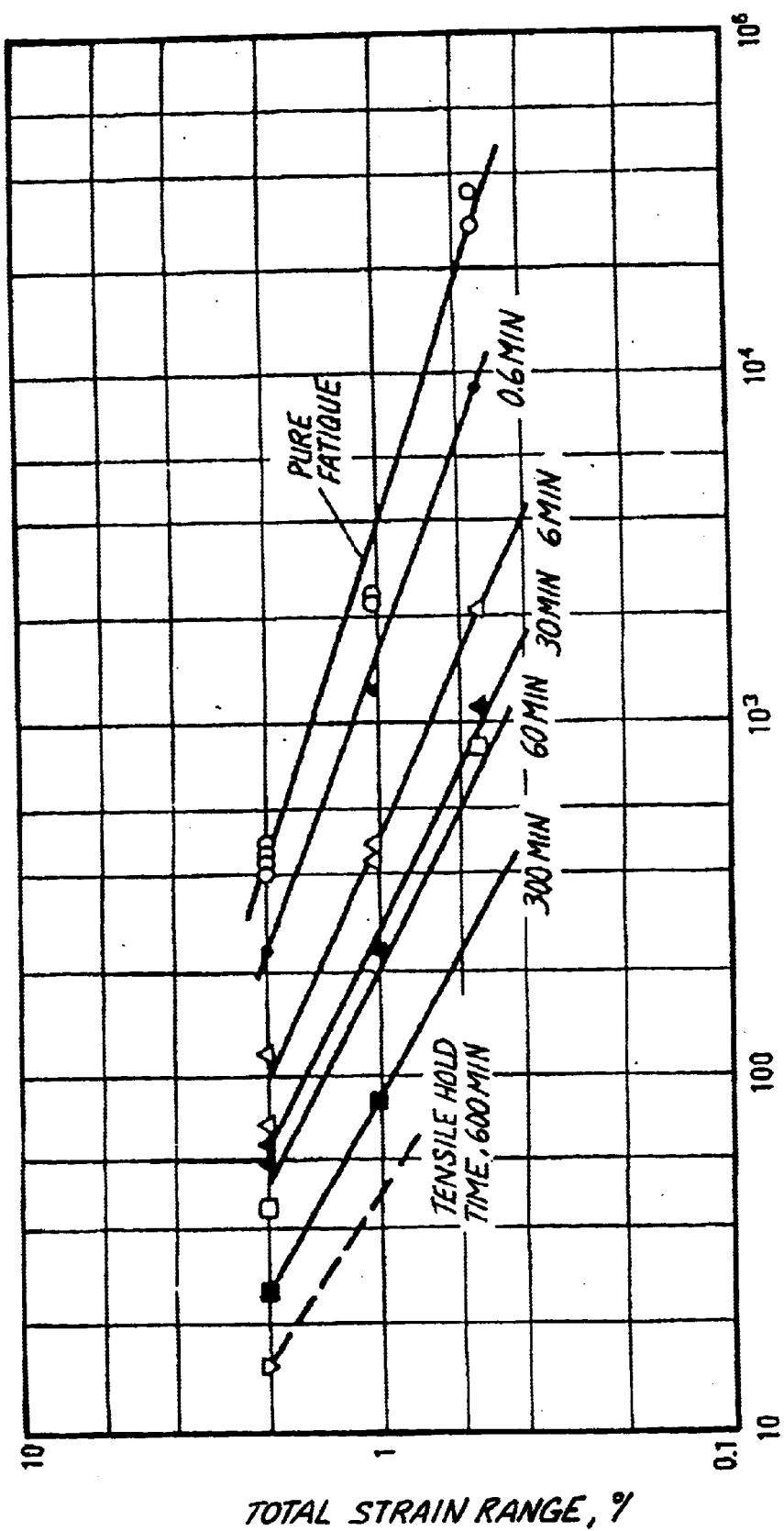
FIG. 11 is a graph showing the total strain range in percentage versus the number of cycles to failure at various hold times.

In general, the present invention provides an apparatus and technique for detecting calibration shifts of a pressure sensor in a pressure transmitter through the counting and monitoring of cyclic and continuous overpressurizations of the sensor. These calibration shifts can be due to several factors including continuous strain cyclic strain, temperature and humidity. All or some of these factors can be correlated to calibration of the sensor and the life span of the sensor using the aforementioned techniques due to the mechanical properties of the sensor material. FIG. 10 is a graph showing amplitude of the output from a pressure sensor versus time. As illustrated in FIG. 10, there is a normal band or operating range for the sensor output. Occasional spikes tend to greatly exceed the pressure sensor output. FIG. 11 is a graph of the total strain range and percentage versus cycles to failure for stainless steel. The various graphs in the figure are for different hold times of the strain. As illustrated in FIG. 11, the number of cycles to failure decreases (i.e., the life of the sensor shortens) with increased strain and with increased tensile hold time. One aspect of the present invention is the recognition of the relationship for the number of cycles (N) to failure as follows:

$$N = f(t, P, T, h) \qquad \text{EQ. 1}$$

where t is the duration of the pressure peak, P is the pressure during the peak, T is the temperature of the medium and h is the humidity of the medium.

Figure 12:
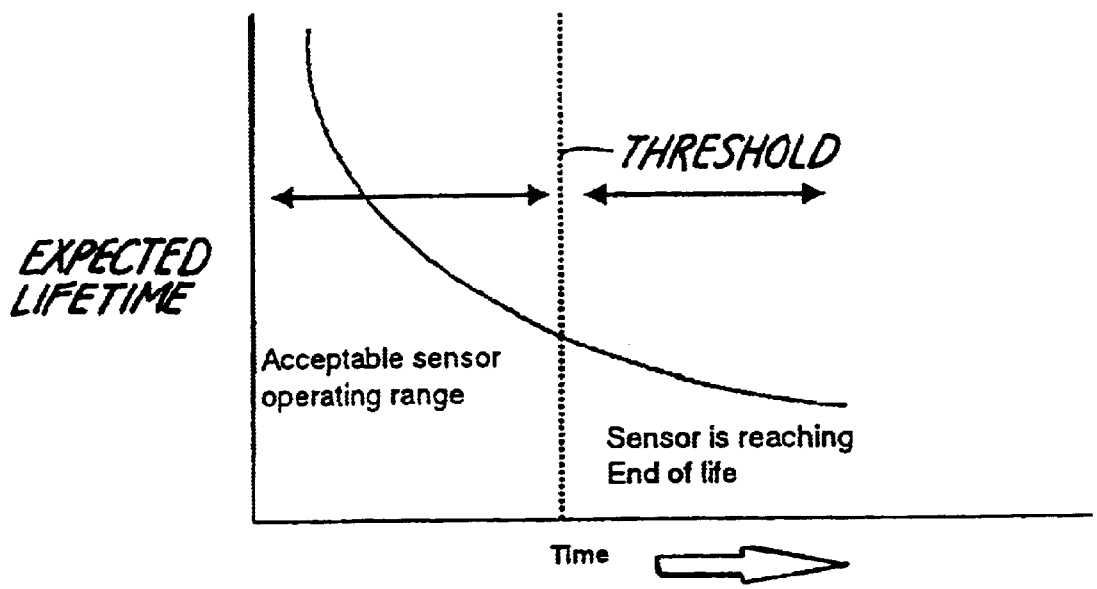
FIG. 12 is a graph of expected lifetime versus time for a pressure sensor due to overpressures.

The functional relationship and the number of cycles to failure can be determined through the properties of the materials or through more advanced learning techniques as set forth herein. With this information, a transmitter in accordance with the present invention can continuous monitor the pressure experienced by the sensor to evaluate the number of overcycles the pressure sensor has experienced. This number can then be compared through diagnostic techniques to the theoretical failure limit of the sensor material and a warning to be issued at a time prior to failure. The transmitter can monitor the peak pressure and peak width and save this data in memory. During an overpressure, the peak pressure can be evaluated using a second order curvefit and using peak detection techniques. This data can be used to correct errors in the sensor output. Eventually, the sensor will fail and a warning can be provided prior to the ultimate failure. As described herein, regression modules, fuzzy logic systems and neural network models are some of the techniques which can be estimating the residual life of the sensor. The output can be in the form of expected lifetime versus time as illustrated in FIG. 12. A threshold can be used to provide an output prior to the ultimate failure of the sensor.

In contrast to typical prior art techniques, the present invention uses the relationship between the number of overpressures that the sensor has experienced to determine the calibration shift and the pressure measurement and the lifetime of the sensor. Typical prior art techniques have only recognized the occurrence of overpressure and not a correlation with the number of overpressures. Further, the prior art has typically failed to provide an alarm prior to the ultimate failure of the sensor.

Although the present invention has been described with reference to preferred embodiments, workers skilled in the art will recognize that changes may be made in form and detail without departing from the spirit and scope of the invention. In general, the invention uses pressure or temperature peak related data and/or humidity data to perform diagnostics on a pressure sensor.

What is claimed is:

1. A pressure transmitter, comprising:
   a pressure sensor adapted to sense a process pressure;
   a controller coupled to the pressure sensor and generating a transmitter output representing the process pressure;
   memory storing predetermined data predicting magnitudes of transmitter output error as a function of cumulative excessive sensor output levels, and storing a record of cumulative excessive sensor output levels; and
   the controller calculating a predicted present magnitude of transmitter output error as a function of the accumulated record and the predetermined data, and generating a prediction output.

2. The pressure transmitter of claim 1 wherein the record is representative of physical changes to the sensor resulting from overpressure.

3. The pressure transmitter of claim 1 wherein the prediction output represents a calibration shift.

4. The pressure transmitter of claim 1 wherein the prediction output is independent of thie present process pressure.

5. The pressure transmitter of claim 1 wherein the prediction output is a function of present process pressure.

6. The pressure transmitter of claim 1 wherein the prediction output includes both a sensor offset error independent of present process pressure and a sensor gain error proportional to present process pressure.

7. The pressure transmitter of claim 1 wherein the predetermined data is based on a computer model of overpressure damage to a comparable sensor.

8. The pressure transmitter of claim 1 wherein the predetermined data is based on experimental testing of overpressure damage to a comparable sensor.

9. The pressure transmitter of claim 1 further comprising a temperature sensor coupled to the controller, the predetermined data predicting magnitudes of transmitter output error as a function of cumulative excessive temperature levels, and the predicted magnitude of transmitter output error being further a function of cumulative excess temperature levels.

10. The pressure transmitter of claim 9 further comprising a humidity sensor coupled to the controller, the predicted magnitude of transmitter output error being further a function of humidity.

11. The pressure transmitter of claim 1 wherein the record is a function of the magnitudes and durations of excessive sensor output levels.

12. The pressure transmitter of claim 1 wherein the controller further stores predetermined data predicting the residual useful life of the pressure sensor in memory.

13. The pressure transmitter of claim 1, wherein the predicted present magnitude of transmitter output error is calculated by the controller using fuzzy logic.

14. The pressure transmitter of claim 1 wherein the predicted present magnitude of transmitter output error is calculated using neural networks.

15. The pressure transmitter of claim 1 wherein the predicted present magnitude of transmitter output error is calculated by the controller using wavelet analysis.

16. The pressure transmitter of claim 1 wherein the predicted present magnitude of transmitter output error is calculated by the controller using autoregression.

17. The pressure transmitter of claim 1 wherein the predicted present magnitude of transmitter output error is calculated by the controller using recursive filtering.

18. The pressure transmitter of claim 1 wherein the predicted present magnitude of transmitter output error is calculated by the controller using adaptive self tuning.

19. The pressure transmitter of claim 1 wherein the transmitter output is corrected as a function of the prediction output.

20. The pressure transmitter of claim 1 wherein the transmitter output comprises an estimated process variable during an occurrence of an excessive sensor output.

21. The pressure transmitter of claim 20 wherein the process variable is estimated by a neural network.

22. The pressure transmitter of claim 20 wherein the process variable is estimated by fuzzy logic.

23. The pressure transmitter of claim 20 wherein the process variable is estimated by curve fitting.

24. The pressure transmitter of claim 20 wherein the process variable is estimated by regression algorithm.

25. A method of predicting the present magnitude of transmitter output error in a pressure transmitter receiving an applied process pressure and having an embedded controller, comprising:

accessing sensed process pressure from a pressure sensor;

generating a transmitter output with a magnitude representing the process pressure;

accessing predetermined data stored in a memory, the data predicting magnitudes of transmitter output error as a function of cumulative excess process pressures;

storing a record of cumulative excess process pressures in the memory, and generating a prediction output in the controller predicting a present magnitude of transmitter output error as a function of the stored record and the accessed data.

26. The method of claim 25 including correcting the transmitter output as a function of prediction output.

27. The method of claim 25 wherein generating a prediction output includes applying fuzzy logic to the sensed process pressure.

28. The method of claim 25 wherein generating a prediction output includes applying the sensed process pressure to a neural network.

29. The method of claim 25 wherein generating a prediction output includes applying the sensed process pressure to a rule.

30. The method of claim 29 wherein the rule comprises comparison to a threshold.

31. The method of claim 25 wherein the prediction output is related to expected lifetime of the pressure sensor.

32. The method of claim 25 including estimating process pressure during occurrence of an excess process pressure.

33. The method of claim 32 wherein the process variable is estimated by a neural network.

34. The method of claim 32 wherein the process variable is estimated by fuzzy logic.

35. The method of claim 32 wherein the process variable is estimated by curve fitting.

36. The method of claim 32 wherein the process variable is estimated by regression algorithm.

37. A pressure transmitter, comprising:

means for sensing a process pressure and for generating a sensor output;

means, coupled to the sensor output, for generating a transmitter output representing the process pressure;

means, coupled to the sensor output, for storing a predetermined record predicting magnitudes of transmitter output error as a function of cumulative excessive sensor output levels, and for storing a record of cumulative excessive sensor output levels; and for generating a prediction output predicting a present magnitude of transmitter output error.

38. A computer readable medium having stored thereon instructions executable by an embedded controller in a pressure transmitter to cause the pressure transmitter to generate a predictive output predicting transmitter error caused by excessive process pressure, the instructions comprising: accessing sensed process pressure from a pressure sensor;

generating a transmitter output with a magnitude representing the process pressure;

accessing predetermined data stored in a memory, the data predicting magnitudes of transmitter output error as a function of cumulative excess process pressures;

storing a record of cumulative excess process pressures in the memory, and generating a prediction output in the controller predicting a present magnitude of transmitter output error as a function of the stored record and the accessed data.

* * * * *

UNITED STATES PATENT AND TRADEMARK OFFICE
CERTIFICATE OF CORRECTION

PATENT NO. : 6,701,274 B1
DATED : March 2, 2004
INVENTOR(S) : Evren Eryurek et al.

It is certified that error appears in the above-identified patent and that said Letters Patent is hereby corrected as shown below:

Title page,
Item [56], References Cited, OTHER PUBLICATIONS, "emWare's Releases" reference, delete "Manufactures" and insert -- Manufacturers --.
"Parallel, Fault-Tolerant Control" reference, delete "Feedater" and insert -- Feedwater --.
Insert:

| | | |
|---|---|---|
| 09/855,179 | 05/14/01 | Eryurek et al. |
| 09/852,102 | 05/09/01 | Eryurek et al. |
| 09/169,873 | 10/12/98 | Eryurek et al. |
| 09/175,832 | 10/19/98 | Eryurek et al. |
| 09/257,896 | 02/25/99 | Eryurek et al. |
| 09/303,869 | 05/03/99 | Eryurek et al. |
| 09/335,212 | 06/17/99 | Kirkpatrick et al. |
| 09/360,473 | 07/23/99 | Eryurek et al. |
| 09/369,530 | 08/06/99 | Eryurek et al. |
| 09/383,828 | 08/27/99 | Eryurek et al. |
| 09/344,631 | 06/25/99 | Eryurek et al. |
| 09/406,263 | 09/24/99 | Kirkpatrick et al. |
| 09/409,098 | 09/30/99 | Eryurek et al. |
| 09/409,114 | 09/30/99 | Eryurek et al. |
| 09/565,604 | 05/04/00 | Eruyrek et al. |
| 09/576,450 | 05/23/00 | David L. Wehrs |
| 09/606,259 | 06/29/00 | Evren Eryurek |
| 09/616,118 | 07/14/00 | Eryurek et al. |
| 09/627,543 | 07/28/00 | Eryurek et al. |
| 09/576,719 | 05/23/00 | Coursolle et al. |
| 09/799,824 | 03/05/01 | Rome et al. |

Column 10,
Line 40, delete "thie" and insert -- the --.

Signed and Sealed this

Fifth Day of October, 2004

JON W. DUDAS
*Director of the United States Patent and Trademark Office*